United States Patent
Conner et al.

(10) Patent No.: US 10,920,478 B2
(45) Date of Patent: Feb. 16, 2021

(54) VEHICLE SYSTEM WITH SELF-ADJUSTING VARIABLE SPEED CLOSURE

(71) Applicant: Ford Global Technologies, LLC, Dearborn, MI (US)

(72) Inventors: Greg Conner, Ann Arbor, MI (US); Donald E. Walsh, II, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 241 days.

(21) Appl. No.: 15/833,664

(22) Filed: Dec. 6, 2017

(65) Prior Publication Data
US 2019/0169914 A1 Jun. 6, 2019

(51) Int. Cl.
*E05F 15/70* (2015.01)
*E05B 83/18* (2014.01)
(Continued)

(52) U.S. Cl.
CPC ............ *E05F 15/70* (2015.01); *B60J 5/101* (2013.01); *E05B 77/54* (2013.01); *E05B 81/04* (2013.01);
(Continued)

(58) Field of Classification Search
CPC ......... E05F 15/70; E05F 15/40; E05F 15/611; E05F 15/00; E05F 15/41; E05F 15/44; E05F 15/49; E05F 15/56; E05F 15/57; E05F 15/59; E05F 15/60; E05F 15/605; E05F 15/632; B60J 5/101; B60J 7/0573; B60J 5/10; E05B 77/54; E05B 81/04; E05B 83/18; E05B 83/16; E05B 85/045; E05B 85/243; E05B 85/04; E05B 85/24; E05Y 2201/22; E05Y 2201/434; E05Y 2400/20; E05Y 2400/36; E05Y 2900/532; E05Y 2900/546; E05Y 2800/73; E05Y 2900/55; E05Y 2400/45; E05Y 2400/86; E05Y 2400/856; E05Y 2900/548;
(Continued)

(56) References Cited

U.S. PATENT DOCUMENTS 5,254,913 A * 10/1993 Yang ..................... H02P 7/298
                                                                318/250
5,982,126 A * 11/1999 Hellinga ................ B60J 5/06
                                                                318/286
(Continued)

FOREIGN PATENT DOCUMENTS

CN 106884595 A 6/2017

*Primary Examiner* — Anthony R Jimenez
(74) *Attorney, Agent, or Firm* — David Coppiellie; Carlson, Gaskey & Olds, P.C.

(57) ABSTRACT

A vehicle system includes a closure panel, one or more panel actuators operable to move the closure panel during opening and closing and to move the closure panel at a closing speed during closing, a latch operable to lock the closure panel, and a controller electrically connected with the panel actuator. The controller is configured to selectively adjust the closing speed of the panel actuator(s) on the next closing, based on past opening and closing of the closure panel. Loss of speed and higher current draws are equated to mechanical interferences in the closing and opening of the closure panel. The speed, voltages, dynamic braking, target speed, and obstacle thresholds can be adjusted in way that facilitates closing the closure panel without the need for servicing.

15 Claims, 4 Drawing Sheets

(51) Int. Cl.
*B60J 5/10* (2006.01)
*E05B 77/54* (2014.01)
*E05B 81/04* (2014.01)
*E05B 85/04* (2014.01)
*E05F 15/611* (2015.01)
*E05F 15/40* (2015.01)
*E05B 83/16* (2014.01)
*E05B 85/24* (2014.01)

(52) U.S. Cl.
CPC ............ *E05B 83/18* (2013.01); *E05B 83/16* (2013.01); *E05B 85/045* (2013.01); *E05B 85/243* (2013.01); *E05F 15/40* (2015.01); *E05F 15/611* (2015.01); *E05Y 2201/22* (2013.01); *E05Y 2201/434* (2013.01); *E05Y 2400/20* (2013.01); *E05Y 2400/36* (2013.01); *E05Y 2900/532* (2013.01); *E05Y 2900/546* (2013.01)

(58) Field of Classification Search
CPC .... E05Y 2400/532; G05B 2219/45018; G05B 2219/45025; G05B 2219/45242; G05B 11/00; G05B 13/00; G05B 13/02; G05B 13/024; G05B 13/0265; G05B 13/04; G05B 13/041; G05B 13/042; G01M 3/12; G01M 15/044; F02D 2200/1015
USPC .......................................................... 701/49
See application file for complete search history.

(56) References Cited

U.S. PATENT DOCUMENTS

| 7,070,226 | B2 | 7/2006 | Cleland et al. |
| 7,218,069 | B2* | 5/2007 | Imai .................... H02H 7/0851 |
| | | | 318/257 |
| 7,688,013 | B2 | 3/2010 | Frommer et al. |
| 8,428,828 | B2 | 4/2013 | Serban et al. |
| 9,048,703 | B2 | 6/2015 | Jang et al. |
| 9,650,815 | B2 | 5/2017 | Conner et al. |
| 9,663,981 | B2 | 5/2017 | Conner et al. |
| 2005/0275363 | A1* | 12/2005 | Honma ................. E05F 15/659 |
| | | | 318/280 |

* cited by examiner

VEHICLE SYSTEM WITH SELF-ADJUSTING VARIABLE SPEED CLOSURE

BACKGROUND

Vehicles often include automated closure panels, such as liftgates, that provide access to an interior space of the vehicle. An automated liftgate, for example, typically includes a motor that opens or closes the liftgate in response to a user pressing a button in the vehicle or on a key fob. Various control schemes are also known for automated closure panels. An example control scheme detects object collisions that hinder opening or closing of the panel and stops or reverses the panel. There are also more complex schemes that detect objects prior to collision and use the detection to transition the closure speed. Overall, there are physical circumstances that introduce variation in the mechanical components of the closure closing process such as green door-seals, latch and striker misalignment, hinge misalignments, and the variation in electrical mechanical components that perform the closing operation, etc. This situation often results in unintended reversals or stops, and can generate quality issues for consumers throughout the life of the product.

SUMMARY

A vehicle system according to an example of the present disclosure includes a closure panel, a panel actuator operable to move the closure panel during opening and closing and to move the closure panel at a closing speed during closing, a latch operable to lock the closure panel, and a controller electrically connected with the panel actuator. The controller is configured to selectively adjust the closing speed of the next closing based on past opening and closing of the closure panel.

Another example vehicle system according to the present disclosure includes a liftgate, a liftgate actuator operable to move the liftgate during opening and closing, and to move the liftgate at a closing speed during the closing, a latch operable to lock the liftgate, the latch including a latch actuator operable to move the latch during latching and unlatching events, and to move the latch at a latching ratchet speed during the latching, and a controller electrically connected with the liftgate actuator and the latch actuator. The controller is configured to selectively adjust the closing speed of the next closing based on opening and closing forces of past opening and closing of the liftgate, and selectively adjust the latching speed of the next latching based on latching and unlatching forces of past latching and unlatching of the latch. The controller is configured to selectively adjust the closing speed of the liftgate actuator (s), and latching components on the next closing, based on past opening and closing of the closure panel. Loss of speed and higher current draws are equated to mechanical interferences in the closing and opening processes. In general, the higher the current draw the higher the mechanical interference, The speed/voltages, dynamic braking, target speed, and obstacle thresholds can all be adjusted in a way that intra-software parameters do not generate conflicts therefore eliminating software triggered false reversals, and facilitates closing/opening the closure panel without the need for servicing.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1A:
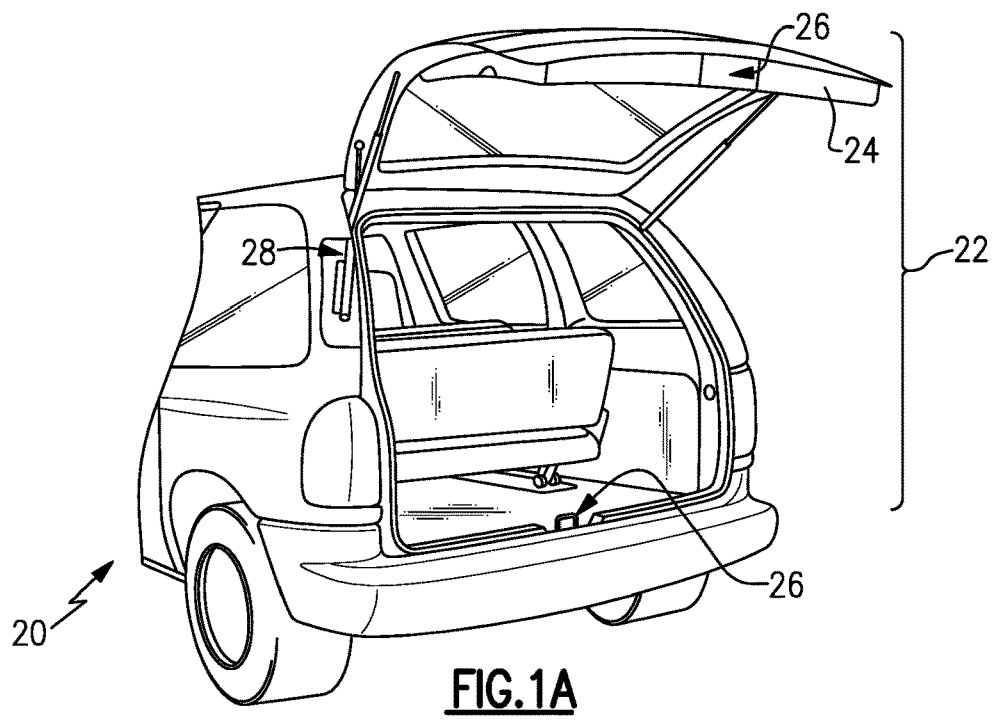
FIG. 1A illustrates an example vehicle and vehicle system.

FIG. 1A illustrates a fragmented view of a vehicle 20, such as a passenger vehicle. The vehicle 20 is also shown in schematic form in FIG. 1B. The vehicle 20 includes a vehicle system 22 ("system 22"). In this example, the system 22 includes a closure panel or liftgate 24 (hereafter "liftgate 24") and a latch 26 that is operable to lock the liftgate 24. Most typically, the liftgate 24 will be on the rear of the vehicle 20 and will serve to provide access to an interior area in the vehicle 20. The examples herein below are presented with respect to a liftgate; however, it is to be understood that this disclosure is not limited to liftgates and is applicable to other types of vehicle closure panels.

Figure 1C:
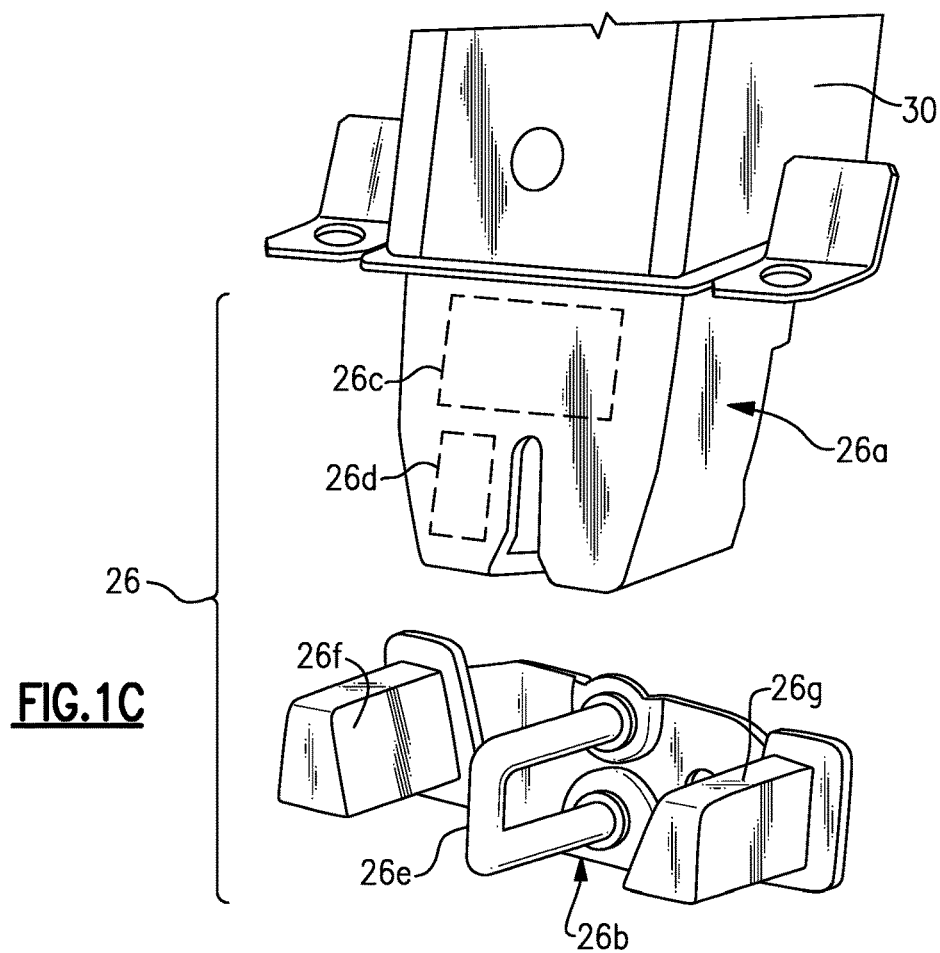
FIG. 1C illustrates an example latch of the vehicle system.
Figure 1B:
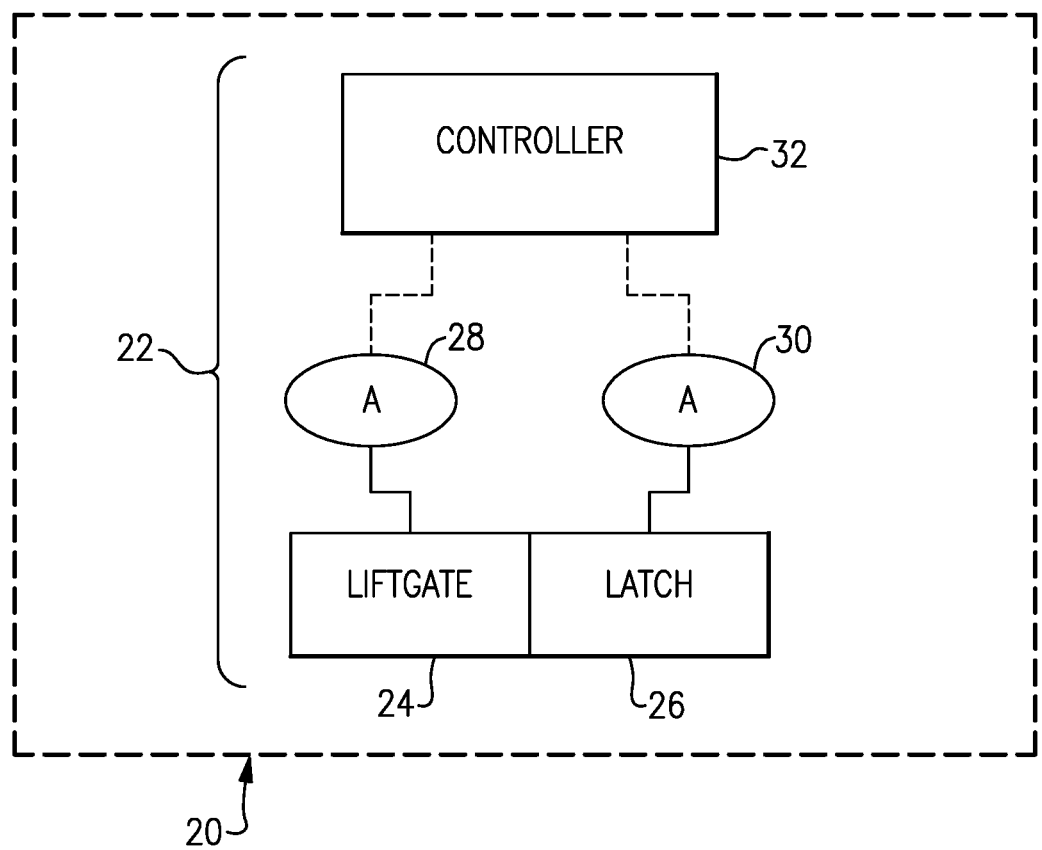
FIG. 1B is a schematic illustration of the vehicle of FIG. 1A.

The latch 26 is shown in FIG. 1C in greater detail. Generally, the latch 26 includes a fork bolt section 26a and a striker section 26b. The fork bolt section 26a is located on the liftgate 24 and moves with the liftgate 24, and the striker section 26 is located on a frame or other portion of the vehicle 20. The fork bolt section 26a further includes, as shown schematically, a latch ratchet 26c and a latch bolt 26d. The striker section 26 in this example includes a striker 26e that is located between spaced-apart bumpers 26f, 26g.

The system 22 in the illustrated example further includes one or more panel/liftgate actuators 28 (FIG. 1B, hereafter "liftgate actuator 28") and a latch actuator 30. The liftgate actuator 28 is operable to move the liftgate 24 during opening and closing events, and to move the liftgate 24 at a closing speed during the closing events. In one example, the liftgate actuator 28 is in a strut that serves to rotate the liftgate 24 between open and closed positions. In FIG. 1A the liftgate 24 is shown in an open position. As used herein, an "opening" or "opening event" refers to an opening of the liftgate 24 from a locked, closed state to an unlocked, open state. A "closing event" refers to a closing of the liftgate 24 from an unlocked, open state to a locked, closed state.

The latch 26 is operable to lock the liftgate 24. The latch actuator 30 is operable to move the latch ratchet 26c of the latch 26 during latching and unlatching events, which in turn moves the latch bolt 26d to engage or disengage the striker 26e. The latch 26 moves at a latching ratchet speed during the latching events. In one example, the latch actuator 30 is a motor that serves to move the latch 26, specifically the latch ratchet 26c, such as to and from a secondary latching position and a primary latching position. As used herein, an "unlatching" or "unlatching event" refers to an unlocking of the latch 26 from a locked, closed state to an unlocked, open state. A "latching" or "latching event" refers to a locking of the latch 26 from an unlocked, open state to a locked, closed state. The latching and unlatching correspond to movement of a latch ratchet 26c to move the latch fork-bolt 26d into and out of engagement with the striker 26e. The engagement of the latch fork-bolt 26d with the striker 26e is the last part of the closing sequence, and moving a fork bolt section 26a onto the striker section 26b is the first part of the closing sequence. These actions reverse on opening. For instance, the speed of the fork bolt section 26a moving onto the striker section 26b is determined by the speed of the liftgate actuator 28. The speed and force of the latch fork-bolt 26d engaging onto the striker 26e is determined by the latch actuator 30 and may be driven by different circuit than the liftgate actuator 28 to electrically control the latch fork-bolt 26d movement. The movement of the latch on the liftgate and the latch ratchet can be controlled by the same microprocessor algorithm such that they are actuated alone or together in an overlapping sequence for cycling the closure.

The construction and operation in general of closure panels and the like, liftgates, latches, locking, unlocking, secondary latching, and primary latching in vehicles is generally known and is thus not described further herein.

The system 22 also includes a controller 32 that is electrically connected with the liftgate actuator 28 and the latch actuator 30. The controller 32 may include hardware, such as a microprocessor and memory, software, or combinations of hardware and software. It is to be appreciated that further examples of the system 22 may include additional components that are not shown or described herein, or that the system 22 may exclude some of the components that are described herein. For instance, in addition to the example shown in FIG. 1, the system 22 of this disclosure may also refer to: only the controller 32; the controller 32, liftgate 24, and liftgate actuator 28; or the controller 32, latch 26, and latch actuator 30.

Figure 2A:
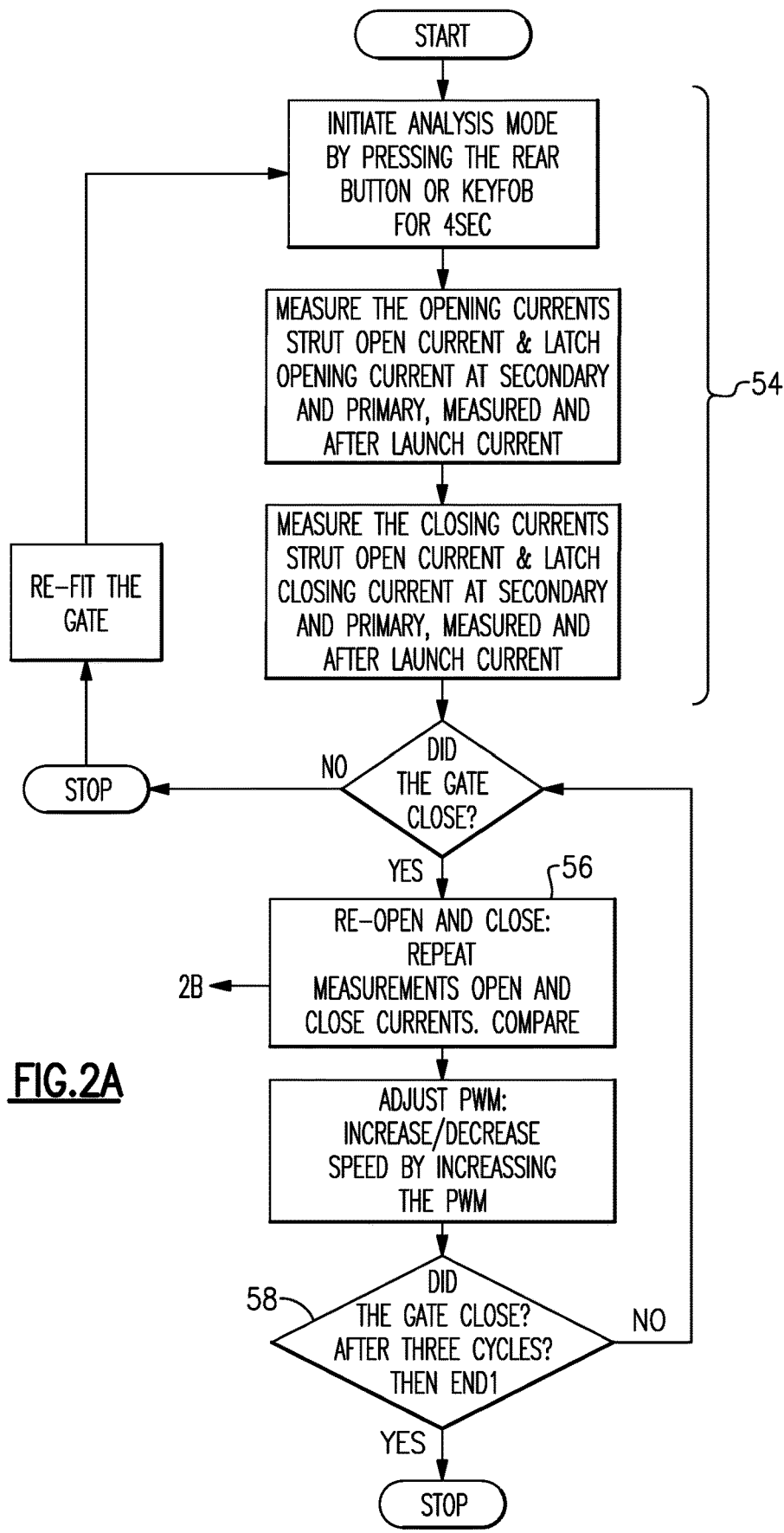
FIGS. 2A and 2B illustrates an example decision algorithm of a controller of a vehicle system.
Figure 2B:
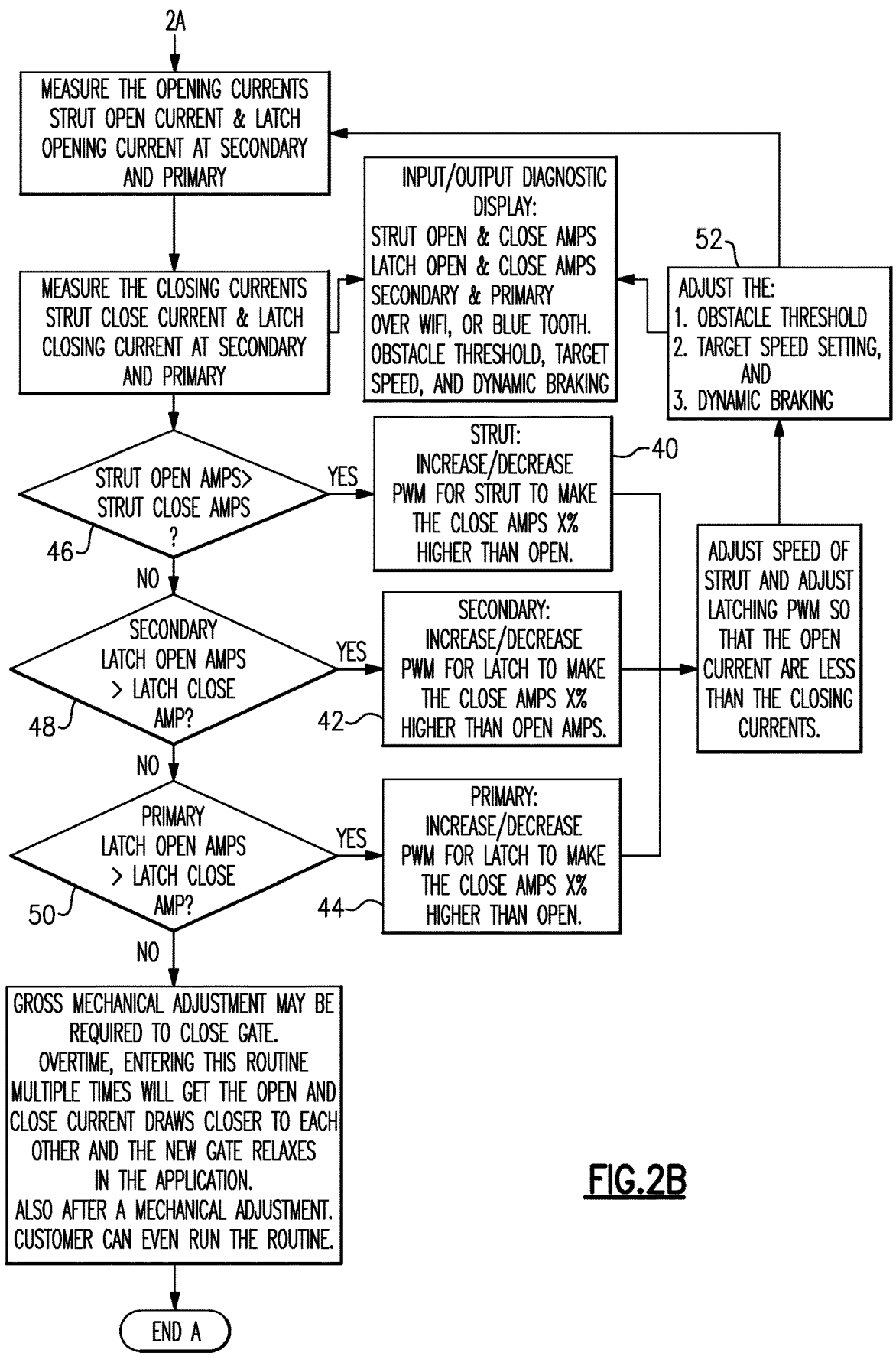

Example configurations of the controller 32 will be described in more detail below. Namely, the controller 32 is configured (e.g., programmed) to adjust a closing speed of the liftgate 24 and/or adjust a latching ratchet speed of the latch 26. FIGS. 2A and 2B illustrate an example of a decision algorithm of the controller 32 to execute the functions described herein.

In one example, the controller 32 is configured to selectively adjust the closing speed of a next closing event of the liftgate 24 based on opening and closing forces of past opening and closing events of the liftgate 24, and selectively adjust the latching ratchet speed of a next latching event based on latching and unlatching forces of past latching and unlatching events of the latch 26. In FIG. 2B, these functions are represented at 40, 42, and 44, also described further below. As used herein, "selectively" refers to a decision in which the controller 32 decides, based on logic and predetermined criteria, such as statistical data, whether to make a speed adjustment.

Closing speed and latching ratchet speed relate to the amount of force required to close and latch a liftgate and latch (i.e., "closing forces"). The closing forces can vary from liftgate-to-liftgate (or other panels) for numerous reasons, such as differences in levels of friction, differences in levels of mechanical interference, differences in assembly alignment/misalignment, differences in alignment and interference with the bumpers 26f/26g, etc. The closing forces can also vary over the life of a liftgate due to changes in friction, changes in mechanical interference, degradation of liftgate seals, new replacement components, etc. To accommodate all of these variations in a single speed system, the set speed would need to be high to ensure closing under worst case scenarios. If the set speed for the single speed system were lowered, liftgates that vary to high closing forces would experience bounce-backs, or unwanted power liftgate reversals. On the other hand, however, liftgates that vary to low closing forces, low latching efforts, may be perceived to "slam" closed for high set speeds in the single speed systems. The liftgate system 22 herein addresses these problems with the controller 32 to adjust the liftgate and latching speed. Thus, the speeds on each individual vehicle liftgate or panel can self-adjust to account for the particular friction levels, mechanical interference, misalignments, seals, etc. of that vehicle, rather than using a "one-size fits all" approach as in single speed systems.

Closing speed and latching ratchet speed, and the forces that resist closing, can be represented by applied voltage and the corresponding draw of electric current of the respective actuators 28/30. For instance, an average current of 8 amperes for a given applied voltage to the liftgate actuator 28 may represent a relatively low resistive force, while an average current of 10 amperes for the same voltage would represent a higher resistive force to closing. Likewise, higher and lower average currents drawn for an applied voltage to the latch actuator 30 represent, respectively, higher and lower resistance forces. Generally, for constant resistance, the speed scales up and down with higher and lower applied voltage and corresponding higher and lower current draw. Average electric voltage can typically be controlled via pulse width modulation, to change the duty cycle of "ON" voltage to thereby change the average level of current drawn.

Similarly, the amount of electric current drawn upon an opening event of the liftgate 24, a closing event of the liftgate 24, a latching event of the latch 26, and an unlatching event of the latch 26 is representative of the amount of force needed to, respectively, open, close, latch, and unlatch under a given applied voltage. As an example, as represented at 46, 48, and 50 in FIG. 2B, the controller 32 receives feedback of the electric current draw for each such event and uses the feedback from both the liftgate and latch actuators to adjust the liftgate speed and/or the latching ratchet speed at 40, 42, and 44 by adjusting applied voltage.

In one example, the controller 32 receives feedback of an opening event of the liftgate 24 and a closing event of the liftgate 24. This feedback is thus feedback of a past opening and closing event of the liftgate 24. The controller 32 can then conduct a logical analysis of the feedback to make a decision of whether to adjust the liftgate speed the next time the liftgate 24 is closed (i.e., the next closing event).

In one example, the logical analysis involves a comparison of the electric current draws of the past opening and closing events. If the current draw of the opening event is greater than the current draw of the closing event, the controller 32 makes the decision that the closing speed is to be increased by increasing the average electric voltage applied for the next closing event. The underlying rationale for this logic decision is that the closing force should normally be higher than the opening force. The reason is because the closing force is typically high to overcome a seal load on closing, whereas the opening force is typically low due to a mechanical assist of seals and power actuator spring assist on opening. If the opening force is greater than the closing force, it means that there is a condition, such as friction, mechanical interference, etc. that requires speed adjustment. The controller 32 can likewise logically decide whether to adjust the latch ratchet speed, based on the initial or final mechanical interference to open or close the liftgate.

If there is a decision that the liftgate speed is to be adjusted, the controller 32 then changes the average voltage that will be applied on the next closing event. In one example, the change is based on the current draw of the past opening event. For instance, the average current that is to be applied on the next closing event is set to be equal to the current draw of the past opening event plus a predetermined percentage of the current draw of the past opening event. In other words, the average current to be applied is a predetermined percentage higher than the current draw of the past opening event. The controller 32 can likewise adjust the latch speed, for one, the other, or both of secondary latching and primary latching (represented at, respectively, 42 and 44 in FIG. 2B). In addition, past plant production data on closing and opening events can be collected and used as a statistical starting point for the next inline vehicle, as trends often occur on production lines. The final adjusted applied electrical parameters can therefore also be of value to these systems in the control of ongoing production quality.

The average current from the level of applied voltage and percentage increase can be calculated based upon statistical analysis for a given system. For instance, through experimental testing and/or standard distributions, histograms can be compiled for of the amount of average current draw to close and the amount of average current draw to latch. The overlap of average current draw to close and the amount of average current draw to latch represents the probability of bounce-back. That is, if the average current draw to close is statistically near to the amount of average current draw to latch, more bounce-backs would be expected statistically. Inversely, if the average current draw to close is statistically far from the amount of average current draw to latch, fewer bounce-backs would be expected statistically. Such an analysis can be used to determine the average current draw (or voltage applied) to close such that there is a statistically small probability of bounce-back for the next closing event. Thus, in addition to adjusting speed to avoid perceived "slamming," the controller 32 also addresses and reduces bounce-backs, or unexpected liftgate reversals.

In a further example, as shown at 52 in FIG. 2B, the controller 32 also adjusts other control parameters of the liftgate 24. For instance, the liftgate 24 has an obstacle threshold and dynamic braking that are adjusted in response to adjustment of the liftgate speed, latch speed, or both. The obstacle threshold is a preset level of opening or closing force at which opening or closing of the liftgate 24 is stopped and/or reversed. As will be appreciated, higher liftgate speeds would produce higher opening or closing forces when colliding with an obstacle. Therefore, the obstacle threshold may be modified, such as an increase, which allows for an increase in the liftgate speed, without generating an obstacle/reversal. In short, the sensitivity to obstacles can be adjusted up or down in the algorithm.

Dynamic braking is a controlled slowing of the liftgate speed as the liftgate 24 approaches the latch 26 upon closing. On closing, the gate is reacting to the pull of gravity. Rapid braking may result in a slowing down of the gate, which may approach or exceed the obstacle threshold and cause false stops and/or false reversals. The controller 32 thus adjusts the braking based on the adjusted liftgate speed, the adjusted obstacle threshold, or both.

The controller 32 may also be operated in two states or modes. The first state is a continuous self-adjusting mode. In this mode, the controller 32 adjusts the speeds as the user operates the liftgate 24.

The second state is an on-demand adjustment mode. In this mode, a user triggers adjustment. For instance, the trigger may be pressing and holding a key fob button or liftgate button. This then triggers the controller 32 to initiate and run an analysis, which is represented at 54 in FIG. 2A. The analysis first involves measuring the relevant electric currents as described above and verifying whether the liftgate 24 closes. If the liftgate 24 does not close, it may need to be mechanically re-fitted. If the liftgate 24 closes, the analysis continues on to block 56 and then adjustment portion of the decision algorithm as shown and described in FIG. 2B. The adjustment can continue for several cycles, but if the liftgate 24 does not close at block 58, it may need to be mechanically re-fitted. Over time, these techniques will reduce the need for dealer liftgate service calls, reducing costs and increasing customer satisfaction.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vehicle system comprising:
 a closure panel;
 at least one panel actuator operable to move the closure panel during opening and closing, and to move the closure panel at a closing speed during closing;
 a latch operable to lock the closure panel; and
 a controller electrically connected with the panel actuator, the controller configured to selectively adjust the closing speed of a next closing based on past opening and closing of the closure panel,
 wherein the latch further comprises a latch actuator electrically connected with the controller and operable to move the latch during latching and unlatching, and to move the latch at a latching ratchet speed during the latching, and the controller is configured to selectively adjust the latching ratchet speed of a next latching based on past latching and unlatching of the latch.

2. The vehicle system as recited in claim 1, wherein the controller is additionally configured to adjust an obstacle threshold in response to adjusting the closing speed, by adjusting voltage and current draw.

3. The vehicle system as recited in claim 1, wherein the controller is additionally configured to adjust a dynamic braking of the closure panel in response to adjusting the closing speed, by adjusting voltage and current draw.

4. The vehicle system as recited in claim 1, wherein the controller is configured to selectively adjust the closing speed of the next closing based on opening and closing forces of past opening and closing events of the closure panel.

5. The vehicle system as recited in claim 4, wherein the opening and closing forces are represented by current draw of the panel actuator, and the controller is configured to adjust the closing speed of the next closing when the current draw of the past opening is greater than the current draw of the past closing.

6. The vehicle system as recited in claim 5, wherein the controller is configured to adjust the closing speed of the next closing based on the current draw of the past opening plus a predetermined percentage of the current draw, or applied voltage, of the past opening.

7. The vehicle system as recited in claim 1, wherein the controller is configured to selectively adjust the latch ratchet speed of the next latching based on latching and unlatching forces of past latching and unlatching of the latch.

8. The vehicle system as recited in claim 7, wherein the latching and unlatching forces are represented by current draw of the latch actuator, and the controller is configured to adjust the latching ratchet speed of the next latching by adjusting voltage when the current draw of the past unlatching is greater than the current draw of the past latching.

9. The vehicle system as recited in claim 8, wherein the controller is configured to adjust the latching ratchet speed of the next latching by adjusting voltage based on the current draw of the past unlatching plus a pre-calculated amount of the voltage of the past unlatching.

10. A vehicle system comprising:
   a controller configured to selectively adjust a closing speed of a next closing of a closure panel of a vehicle based on opening and closing forces of past opening and closing of the closure panel,
   wherein the opening and closing forces are represented by current draw of a panel actuator, and the controller is configured to adjust the closing speed of the next closing by adjusting voltage when the current draw of the past opening is greater than the current draw of the past closing,
   the controller is configured to adjust the closing speed of the next closing by adjusting voltage based on the current draw of the past opening plus a pre-calculated amount of the voltage or current draw of the past opening, and
   the controller is configured to selectively adjust a latching speed of a next latching event of a latch that is operable to lock the closure panel based on the latching and unlatching forces of past latching and unlatching of the latch.

11. The vehicle system as recited in claim 10, wherein the latching and unlatching forces are represented by current draw of a latch actuator, and the controller is configured to adjust the latching speed of the next latching when the current draw of the past unlatching is greater than the current draw of the past latching.

12. The vehicle system as recited in claim 11, wherein the controller is configured to adjust the latching speed of the next latching by adjusting voltage based on the current draw of the past unlatching plus a pre-calculated amount of the voltage of the past unlatching.

13. The vehicle system as recited in claim 12, wherein the controller is additionally configured to adjust an obstacle threshold in response to adjusting the closing speed.

14. The vehicle system as recited in claim 13, wherein the controller is additionally configured to adjust a dynamic braking of the closure panel in response to adjusting the closing speed.

15. A vehicle system comprising:
   a liftgate;
   a liftgate actuator operable to move the liftgate during opening and closing, and to move the liftgate at a closing speed during the closing;
   a latch operable to lock the liftgate, the latch including a latch actuator operable to move the latch during latching and unlatching events, and to move the latch at a latching ratchet speed during the latching; and
   a controller electrically connected with the liftgate actuator and the latch actuator, the controller configured to:
      selectively adjust the closing speed of a next closing based on opening and closing forces of past opening and closing of the liftgate, and
      selectively adjust the latching ratchet speed of the next latching based on latching and unlatching forces of past latching and unlatching of the latch.

* * * * *